(12) United States Patent
Brown et al.

(10) Patent No.: US 9,141,405 B2
(45) Date of Patent: Sep. 22, 2015

(54) USER INTERFACE CONSTRUCTION

(75) Inventors: Martin Brown, Hursley (GB); David T. G. Drakard, Hursley (GB); Christopher Knott, London (GB); Henning Lueke, Emsdetten (DE); Anthony P. Papageorgiou, Hampshire (GB); Alena Shunkevich, London (GB)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 13/326,658

(22) Filed: Dec. 15, 2011

(65) Prior Publication Data

US 2012/0159362 A1 Jun. 21, 2012

(30) Foreign Application Priority Data

Dec. 15, 2010 (EP) .................................... 10195035

(51) Int. Cl.
*G06F 3/048* (2013.01)
*G06F 9/44* (2006.01)
*H04M 1/725* (2006.01)

(52) U.S. Cl.
CPC ......... *G06F 9/4443* (2013.01); *H04M 1/72586* (2013.01)

(58) Field of Classification Search
None
See application file for complete search history.

(56) References Cited

U.S. PATENT DOCUMENTS

| 5,564,004 | A | * | 10/1996 | Grossman et al. ............. 715/835 |
|---|---|---|---|---|
| 5,726,688 | A | * | 3/1998 | Siefert et al. .................. 715/821 |
| 6,021,403 | A | * | 2/2000 | Horvitz et al. .................. 706/45 |
| 7,707,514 | B2 | | 4/2010 | Forstall et al. |
| 2008/0307358 | A1 | | 12/2008 | Hintermeister et al. |
| 2009/0049389 | A1 | | 2/2009 | Kuzmanovic |
| 2009/0094554 | A1 | | 4/2009 | Karstens |
| 2010/0299596 | A1 | * | 11/2010 | Zalewski et al. .............. 715/702 |

OTHER PUBLICATIONS

IBM, Method, System and Apparatus for Usage Based Filtering of Elements of Dialog Based User Interfaces Using Local and central Repositories, www.ip.com, IPCOM000177012D, Dec. 3, 2008.
US 7,747,952, 06/2010, McCormack et al. (withdrawn)

* cited by examiner

*Primary Examiner* — Matt Kim
*Assistant Examiner* — William Trapanese
(74) *Attorney, Agent, or Firm* — Jordan IP Law, LLC (57) ABSTRACT

A system and method for constructing a graphical user interface for an application being accessed by a user are provided. The method includes measuring the user's current work rate, deriving a threshold from the user's current work rate, determining the user's current activity within the application, assigning a value to the user's current activity, accessing a model for the application, the model defining links between activities within the application, assigning values to activities linked within the accessed model to the user's current activity, and displaying a control element in a graphical user interface for each activity with a value above the derived threshold.

17 Claims, 6 Drawing Sheets

USER INTERFACE CONSTRUCTION

BACKGROUND

Embodiments of the present invention relate to constructing a graphical user interface, and in particular, to constructing a graphical user interface for an application being accessed by a user.

User devices such as computers and mobiles phones run applications with which a user can interact via a graphical user interface. When using such an interface it is common for there to be large amounts of superfluous control elements available to the user. A control element is any button, window, icon, or other distinguishable element of the user interface. These extra control elements take up valuable screen space and direct attention away from the task the user is currently performing. Although the user may wish to access all of the control elements at different times, it is very unlikely that they need constant access to all of the different control elements that can be presented to the user.

Existing solutions to these problems include task oriented user interfaces. One such solution is 'perspectives' in the Eclipse IDE. This capability allows the user to manually switch the user interface to display only the elements of interest in the current task that the user is performing. However, the user must manually change the perspective to match the task they are about to perform. Moreover, the process of adding and/or removing elements to and from the user interface based on their specific requirements can be time consuming and complicated.

Another solution to the problem of excessive numbers of control elements in a user interface is to hide those user interface elements which are not commonly used. A feature like this can be seen in some versions of Microsoft Office products (Microsoft, Windows, Windows NT and the Windows logo are trademarks of Microsoft Corporation in the United States, other countries or both) whereby menu items are hidden if they are not often used. When a user accesses a menu, they are not shown all of the available options, only a subset is actually presented to the user. However, if a user does require one of the hidden UI elements, the specific control element can be hard to locate and they will always require further user actions to locate the specific desired control element.

BRIEF SUMMARY

Embodiments of the present invention are made in view of the above problems.

According to an embodiment of the present invention, there may be provided a system for constructing a graphical user interface for an application being accessed by a user comprising a processing device arranged to measure the user's current work rate, derive a threshold from the user's current work rate, determine the user's current activity within the application, assign a value to the user's current activity, access a model for the application, the model defining links between activities within the application, and assign values to activities linked within the accessed model to the user's current activity, and a display device arranged to display a control element in a graphical user interface for each activity with a value above the derived threshold.

In addition, embodiments may also include a computer program product on a computer readable medium for constructing a graphical user interface for an application being accessed by a user, the product comprising instructions for measuring the user's current work rate, deriving a threshold from the user's current work rate, determining the user's current activity within the application, assigning a value to the user's current activity, accessing a model for the application, the model defining links between activities within the application, assigning values to activities linked within the accessed model to the user's current activity, and displaying a control element in a graphical user interface for each activity with a value above the derived threshold.

Owing to the invention, it is possible to provide a user interface that can be dynamically filtered such that all control elements are available to a user when they need them, but a streamlined user interface is displayed when a user is actively performing a task. In one embodiment, the invention provides progressive disclosure of context sensitive assistive information based on the user's activity rate. As the user is working more or fewer control elements will be displayed depending upon the user's work rate and on the specifics of the user's current activity. For example, if the user is working at a fast rate, which can be measured by keystrokes, then fewer control elements will be displayed to the user. Once the user's work rate slows, then more control elements will be displayed to the user in the graphical user interface and these will be relevant to the specific activity that the user is undertaking. No specific user interactions with the graphical user interface are required to make the invention function, all of the processing required to make the improved user interface will take place in the background automatically. The improved system would require user interfaces to be built with this control system in mind and provide aesthetically pleasing and seamless methods of animating user interface elements in and out of the user's view.

Preferably, the step of assigning values to activities linked within the accessed model to the user's current activity comprises assigning a value to the linked activities as a function of the value assigned to the user's current activity. A value is assigned to an activity that a user is currently undertaking. This might be an absolute value or may be a relative value based upon how long or how frequently the user is undertaking the specific activity. This value can then be used to create values for activities that are linked to the user's current activity in the model of the application's activities. The function might be a simple percentage function that is set at 50%, for example. A user might be using a table tool (as the current activity) and this may be linked in the model of the application to an insert function. If the value assigned to the table tool is 8/10, then the insert function will be assigned a value of 4/10, using the 50% mentioned above. Any other activities also linked to the table tool will be scored in the same way.

Advantageously, one or more links in the model are weighted, and the step of assigning values to activities linked within the accessed model to the user's current activity comprises assigning a value to the linked activities as a function of the weighting for the respective link. To provide a more flexible and functional graphical user interface for an application, the model may contain links that are weighted. Some or all of the links can be weighted. This weight can said to represent the strength of the connection between different activities within an application. Using the example above, the table tool and the insert function may only have a weighting on their link in the model of 25%. This would reduce the assigned value of the insert function to 1/10. The weighting can be directional within the graph, with each link carrying two weightings, one for each direction. The use of weightings will increase the likelihood that the graphical user interface, which is created for the user, will be representative of the actual actions that the user might wish to carry out.

Where links in a model are weighted it is also preferable to record the user's activity within the application and adjust the weighting of links within the model according to the user's recorded activity. This provides the dynamic modifying of the weighting of the links between the activities in the model based on usage patterns. For example, if activities A and B are regularly used together by a specific user, the model can be modified to increase the strength of the weighting of the link between them. This adjustment can also be the weakening of links, for example if previously strongly related activities are not often actually used together, the creating of links when two disconnected activities are regularly used together (a link weighting of zero changed to non-zero) and destroying links when two weakly related activities are not often used together (a link weighting above zero changed to zero). The usage patterns which would be used to dynamically modify the links would be sampled over a considerably longer time (for example hours or days of usage) than those used to determine the value attached to activities. Over time, this capability would enable to model to learn and respond better to the user's individual behaviour.

Ideally, the step of displaying a control element in a graphical user interface for each activity with a value above the derived threshold comprises displaying each respective control element at a prominence according to the size of its current value. The prominence within the user interface that is accorded to each control element that is displayed need not be the same. Some activities might exceed the threshold by much higher amounts and therefore the respective control elements can be afforded higher prominence. This might be achieved by varying the size of the control elements, but could also be achieved by changing the location of control elements. For example, activities that exceed the threshold by only small amounts can be placed near the corner of the usable display area, whereas those that exceed the threshold by the largest amount can be placed more centrally.

Advantageously, the method further comprises the step of periodically decrementing the current values of activities. The values of the activities that are above zero can be controlled to gradually reduce in value over time. This is used to represent the fact that the user is likely to be less interested in specific activities as time passes from the user performing an action that caused the particular activity to have a non-zero value. This will also mean that the display of a control element could be removed from the graphical user interface, should the value assigned to the activity represented by the specific control element fall below the current threshold. This adjustment of the values downwards over time produces a better experience for the user of the graphical user interface.

Preferably, the method further comprises the step of raising the current value of an activity which is linked to an activity with a current value above zero, according to a predefined algorithm. The values assigned to activities within the model for the application can spread outwards from the original activity that created a non-zero value for a specific activity beyond just those activities that are directly connected to the original user action. In this way an algorithm operates to raise values throughout the model of the activities according to the connections between the linked activities. This will cause a large number of activities to have non-zero values, but control elements will not be displayed unless they have a value that is above the current threshold based upon the user's work rate. Again, this helps to provide a graphical user interface that is responsive to the actual user's likely future needs in terms of those control elements that they actually require.

An embodiment of the present invention provides a method of constructing a graphical user interface for an application being accessed by a user comprising measuring the user's current work rate, deriving a threshold from the user's current work rate, determining the user's current activity within the application, assigning a value to the user's current activity, accessing a model for the application, the model defining links between activities within the application, assigning values to activities linked within the accessed model to the user's current activity, and displaying a control element in a graphical user interface for each activity with a value above the derived threshold.

According to an embodiment of the present invention, there is provided system comprising a display device, and a processing device configured to measure a current work rate of a user, derive a threshold from the measured current work rate, determine a current activity within an application of the user. assign a value to the determined current activity, access a model for the application, the model defining links between one or more activities within the application, assign values to each of the one or more activities linked within the accessed model to the determined current activity, and display a control element in a graphical user interface for each activity having a value above the derived threshold.

In addition, embodiments may include a computer readable storage medium comprising a set of instructions, which, if executed by a processor, cause a computer to measure a current work rate of a user, derive a threshold from the measured current work rate; determine a current activity within an application of the user, assign a value to the determined current activity, access a model for the application, the model defining links between one or more activities within the application, assign values to each of the one or more activities linked within the accessed model to the determined current activity, and display a control element in a graphical user interface for each activity having a value above the derived threshold.

According to another embodiment of the present invention, there may be provided a method of constructing a graphical user interface for an application being accessed by a user comprising measuring the user's current work rate, deriving a threshold from the user's current work rate, determining the user's current activity within the application, assigning a value to the user's current activity, accessing a model for the application, the model defining links between activities within the application, assigning values to activities linked within the accessed model to the user's current activity, and displaying a control element in a graphical user interface for each activity with a value above the derived threshold.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

A method for constructing a graphical user interface and a graphical user interface construction system according to embodiments of the present invention will be described below with reference to the accompanying drawings.

Figure 1:
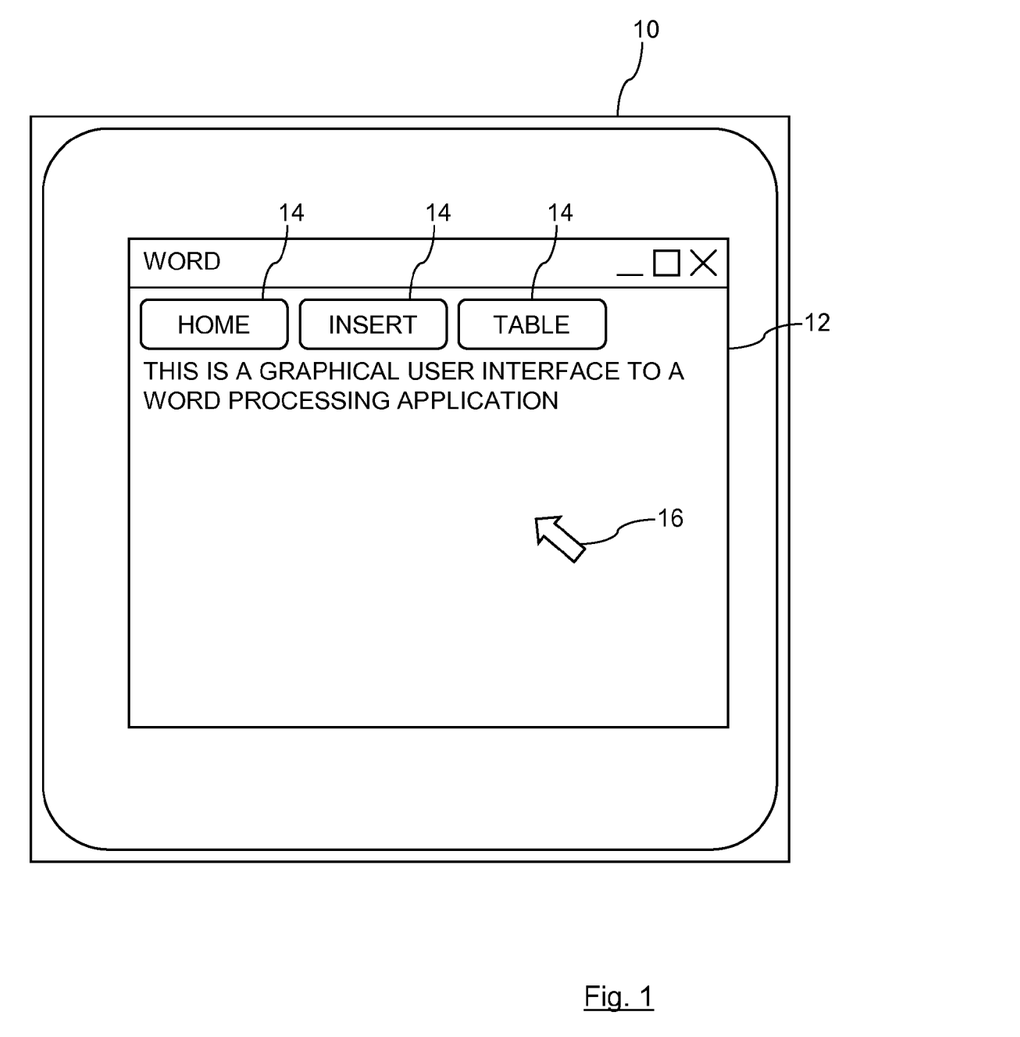
FIG. 1 is a schematic diagram of a display device in accordance with an embodiment of the present invention.

First, a display device according to an embodiment of the present invention will be described with reference to FIG. 1. As shown in FIG. 1, a display device 10 illustrates a graphical user interface 12 for a word-processing application "WORD". The display device 10 includes part of a standard desktop computing system, where a user has access to a keyboard and a mouse (not shown) in addition to the display device 10. A processing device is providing the processing power to control the display device 10 under a user's control of the keyboard and mouse. The processing device may be provided locally to the user or may be provided remotely. In this latter case, the processing device is connected to the user's keyboard, mouse and display 10 via a network.

The graphical user interface 12 is the interface by which the user interacts with the application being run by the processing device. The graphical user interface 12 includes various control elements 14, in this case on-screen "buttons" that a user can access with a cursor 16. A control element in a graphical user interface 12 is anything with which a user can interact. The standard icons in the top right-hand corner of the graphical user interface 12, being the icons for "minimize", "maximize" and "close application" are also control elements 14, as the user can click on these icons with the cursor 16. All of the control elements 14 that are displayed can be accessed by the user.

In desktop applications, as shown in FIG. 1, the advances in display technology have provided end-users with larger screens with increased resolution. This means that it is possible for the designers of applications such as that shown in FIG. 1 to have a relatively large area of the usable display area available for user interface elements 14. A larger display device means that more can be carried in the graphical user interface 12 without reducing the area of the screen in which the user is actually working. Desktop software packages that are available at the current time have large areas of the graphical user interface 12 given over to control elements 14.

Figure 2:
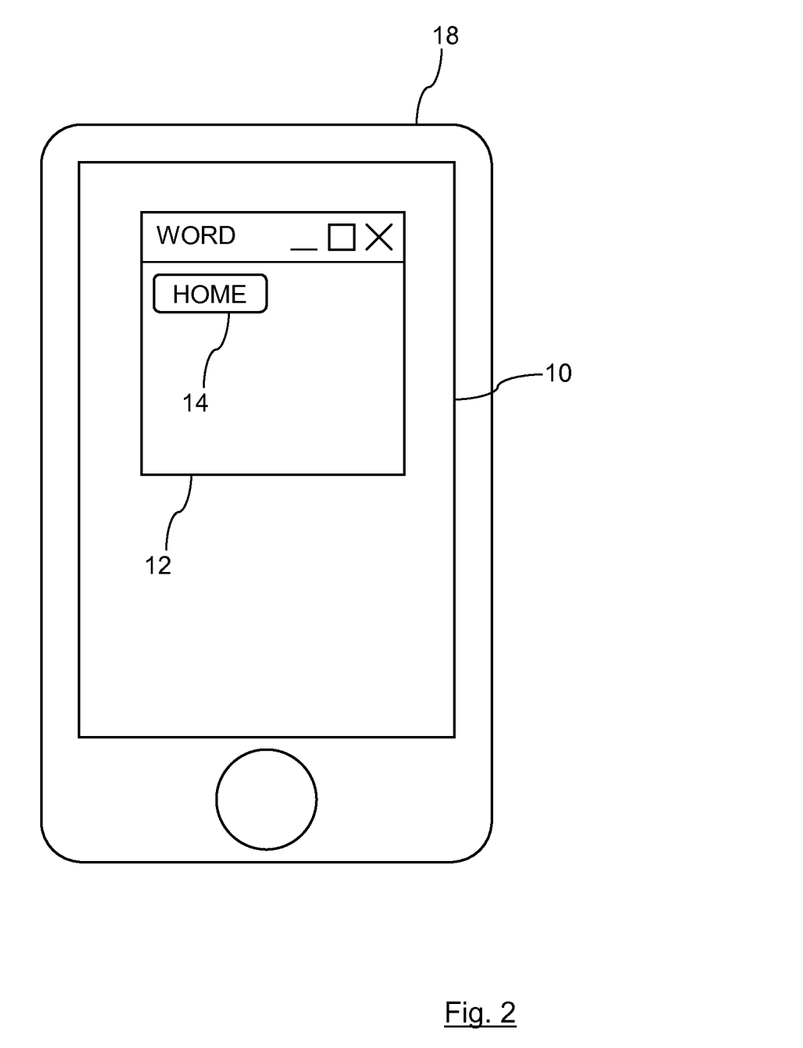
FIG. 2 is a schematic diagram of a mobile device in accordance with an embodiment of the present invention.

However, there is a class of devices for whom the question of usable display area is a significant issue. FIG. 2 shows a mobile device 18, which has a display device 10 (e.g., a touch screen). The mobile device 18 may be a palm-style computer (pda) or may be a mobile telephone that has extensive display and processing capability (often referred to as a smartphone). These types of devices 18 are increasingly common as they provide mobile access to a wide variety of applications such as word-processing and also, if wireless capability is present, to access email and Internet services. They generally have a display area 10 which is no bigger than seven inches on the diagonal.

In devices such as those shown in FIG. 2, there are two significant issues involved in the interaction with the graphical user interface 12 of any application being run by the mobile device 18. Firstly, the usable display area is significantly smaller than that available in a desktop computing environment so that the number of control elements 14 that can be displayed is reduced. Secondly, the user accesses any control elements 14 with their finger on the display device 10, rather than with a cursor 16, and this means that the control elements have size constraints as the user must be able to press one and only one control element 14, when interacting with the graphical user interface 12.

All of this means that the design of the graphical user interface 12 for an application that will run on a mobile device 18 is a difficult proposition. The graphical user interface 12 must provide the user with access to the control elements 14 that they wish to use in a simple and effective manner, without cluttering up the usable display area or without making the control elements 14 so small that a significant number of users have trouble accessing the control elements 14. The provision of the graphical user interface 12 should be such that the user of the application represented by the graphical user interface 12 is able to interact with the interface 12 without slowing their work rate or annoying the user.

Figure 3:
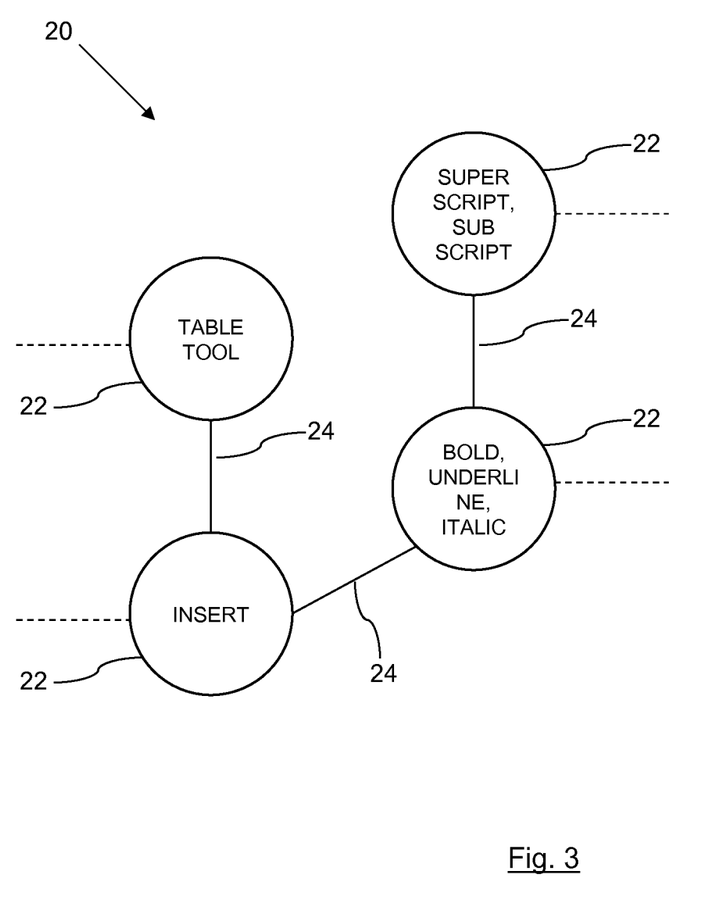
FIG. 3 is a schematic diagram of a model in accordance with an embodiment of the present invention.

In order to provide a better graphical user interface 12, the user interface 12 is dynamically filtered such that all control elements 14 are available to a user when the user needs them, but a streamlined user interface 12 is displayed when a user is actively performing a specific task. This is achieved through the use of a model which describes the relationships between various control elements 14. An example of part of such a model 20 is illustrated in FIG. 3. The model 20 includes a graph of nodes 22 and links 24. Each node 22 represents a user activity for which there is an associated control element 14.

By detecting the control elements 14 that the user is currently focused on, it is possible to use the relational model 20 to display control elements 14 with varying degrees of separation based on the user's current work rate. For example, if the user is working quickly and not pausing for thought it is likely that there is no need for unrelated control elements 14 to be displayed on the screen of the display device 10, so these can be hidden. However if the user's work rate drops below a certain level then the graphical user interface 12 can be controlled to progressively display more control elements 14 with greater relational separation.

Users of this system will be presented with less superfluous control elements 14 whilst performing everyday tasks but will still have the entire graphical user interface 12 available to them when they need it. There is also the added value to a new user whereby they can quickly see how various functions and elements are related based on the patterns of their display in the graphical user interface 12. The system would be particularly valuable on small screen devices, such as the mobile device 18 of FIG. 2, where each element takes up a proportionately large area of the display. As mentioned above, touch screen mobile devices 18 suffer from this problem particularly as buttons 14 have to be large enough to touch.

This system is underpinned by the relational model 20 which describes the relationship between the different control elements 14 of the graphical user interface 12. In FIG. 3, this model 20 can be described as a node graph in which each node 22 represents a control element 14, and edges 24 represent a possibly weighted relationship between the control elements 14. The control elements 14 will also have a notional value associated with them which describes how actively each one is being used. Every usage (such as a click, key press or mouse over etc.) of an element 14 will send an event to a monitor which will raise the value of that element 14. During periods of inactivity, elements will cool.

Figure 4:
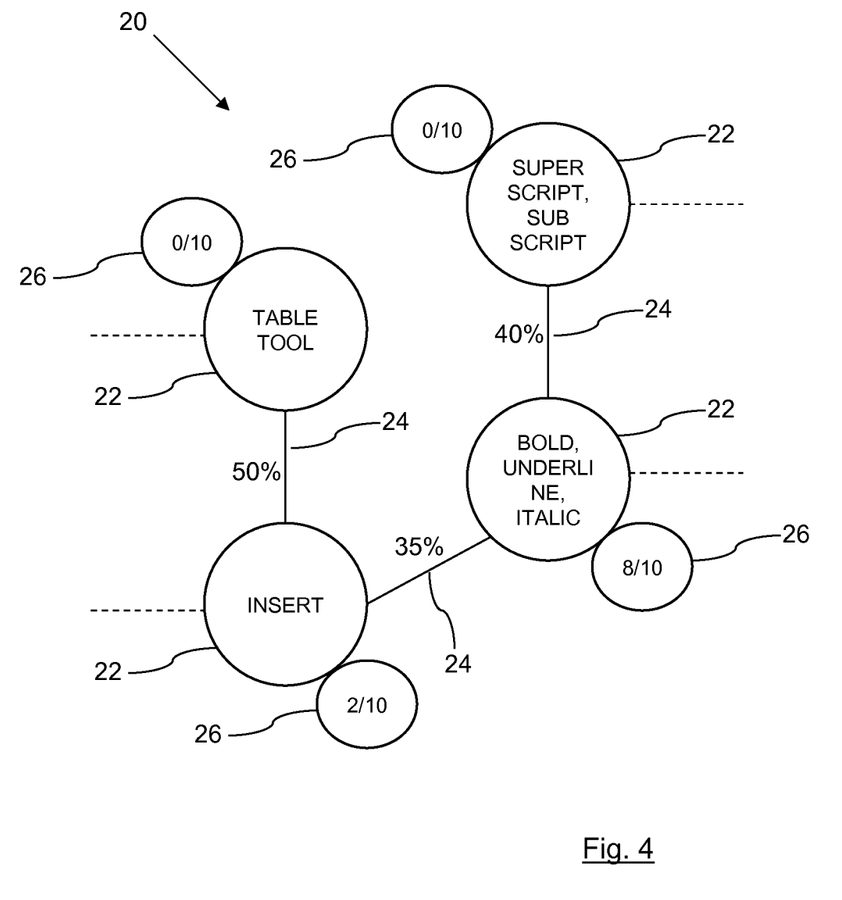
FIG. 4 is a schematic diagram of the model in accordance with an embodiment of the present invention.

Activity events from control elements 14 can also used to monitor the user's activity rate. The activity rate can be high or low, based on the rate of events being triggered from the graphical user interface 12 as a whole. Activity will also have a sparse or focused distribution based on the distance between the elements 14 from which the activity events originated. Using this information the graphical user interface 12 can be dynamically filtered in real time as the user's actions cause the model's variables to change. FIG. 4 shows a model 20 in which the links 24 are weighted and also shows values 26 associated with the different activities represented in the model 20.

The value 26 that is attached to a node 22 within the model 20 can be modeled as a measure of the "heat" of an activity. This has a number of useful properties. Firstly, an activity will "heat" up more as it is used and will also "cool" as the activity is no longer used by the person accessing the graphical user interface 12. Secondly, the "heat" in a single activity (created by the use of the activity) can "conduct" to activities that are linked to any "hot" activity within the model 20. In this way other activities within the model 20 will have their respective values 26 increased even though the user has not directly accessed the specific activity.

Where links 24 in a model 20 are weighted it is possible to record the user's activity within the application and adjust the weighting of links 24 within the model 20 according to the user's recorded activity. This recording and adjusting results in the dynamic modifying of the weighting of the links 24 between the activities in the model 20 based on patterns of the actual actions taken by the user. For example, if two activities are regularly used together by a particular user, the model 20 can be modified to increase the strength of the weighting of the link 24 between the two activities.

This adjustment can also result in the weakening of the weighting attached to links 24. For example, if previously strongly related activities are not often actually used together, then the weighting can be reduced. The adjustment can also cause the creation of links 24 when two disconnected activities are regularly used together (a link weighting of zero changed to non-zero) and the removal of links 24 when two weakly related activities are not often used together (a link weighting above zero changed to zero). The patterns of a user within an application would be used to dynamically modify the links could be sampled over a considerably longer time (for example hours or days of usage) than those used to determine the value attached to activities. Over time, this capability would enable to model 20 to learn and respond better to the user's individual behavior.

As an example, the system would optimize the user experience when performing some common actions in a word-processing application, in the following manner. Initially the user begins writing a document. At this point the user is steadily writing text into the editor without taking any large pauses between actions. The system interprets this behavior as the user having a high and very focused activity rate on the text editing element. In response to this, all control elements 14 other than the text editing element are hidden, maximizing screen real estate for the editor, meaning the user can see more of the document they are working on, if the display area is limited.

The user reaches a point in their document where they want to introduce a diagram. For this they want to create a figure heading in italics and import an image from a file. The user stops typing briefly, which causes the system to recognize the drop in activity rate. At this point the system causes control elements 14 which are strongly related to "hot" elements (i.e. text editor) to be displayed. As the "text formatting toolbar" element is closely related to the text editor, the graphical user interface 12 will display this element 14 at this time. The italics function is now available to the user and they use this to format their figure heading. The action of italicizing text increases the activity rate and stops other loosely related elements 14 from being displayed.

Figure 5:
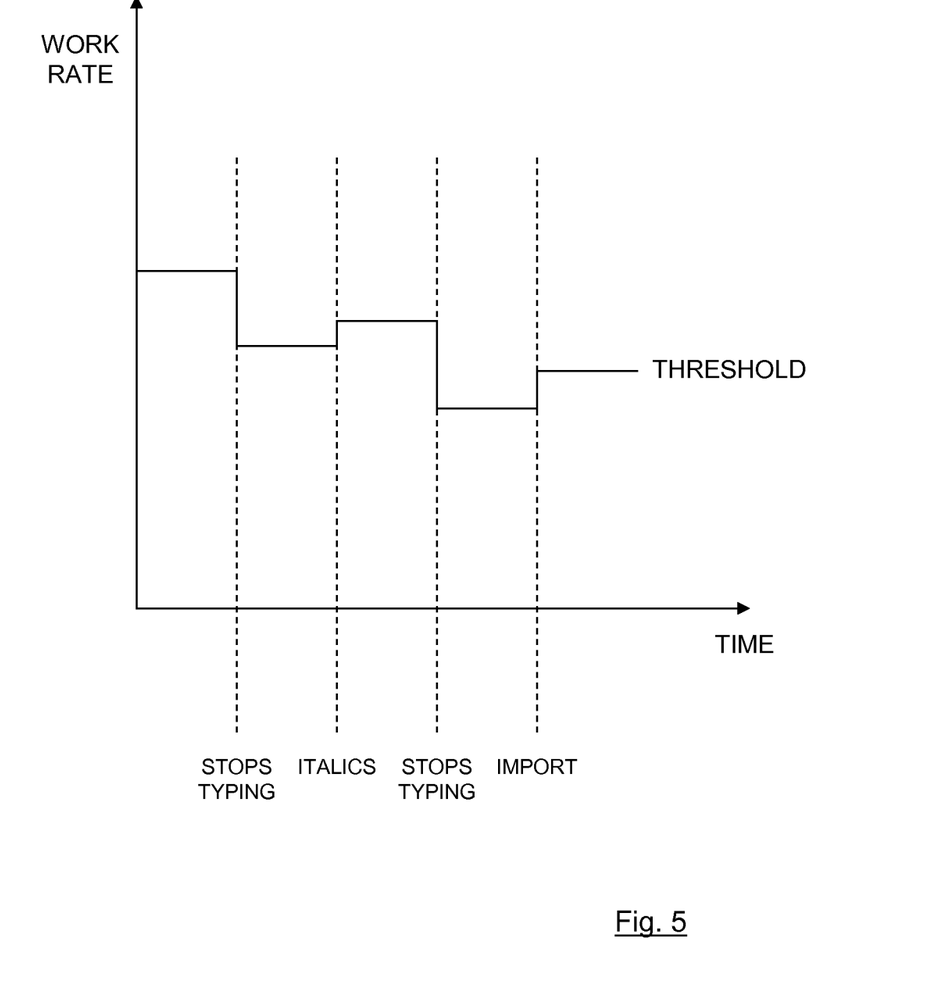
FIG. 5 is a graph of a user's work rate over time in accordance with an embodiment of the present invention.
Figure 6:
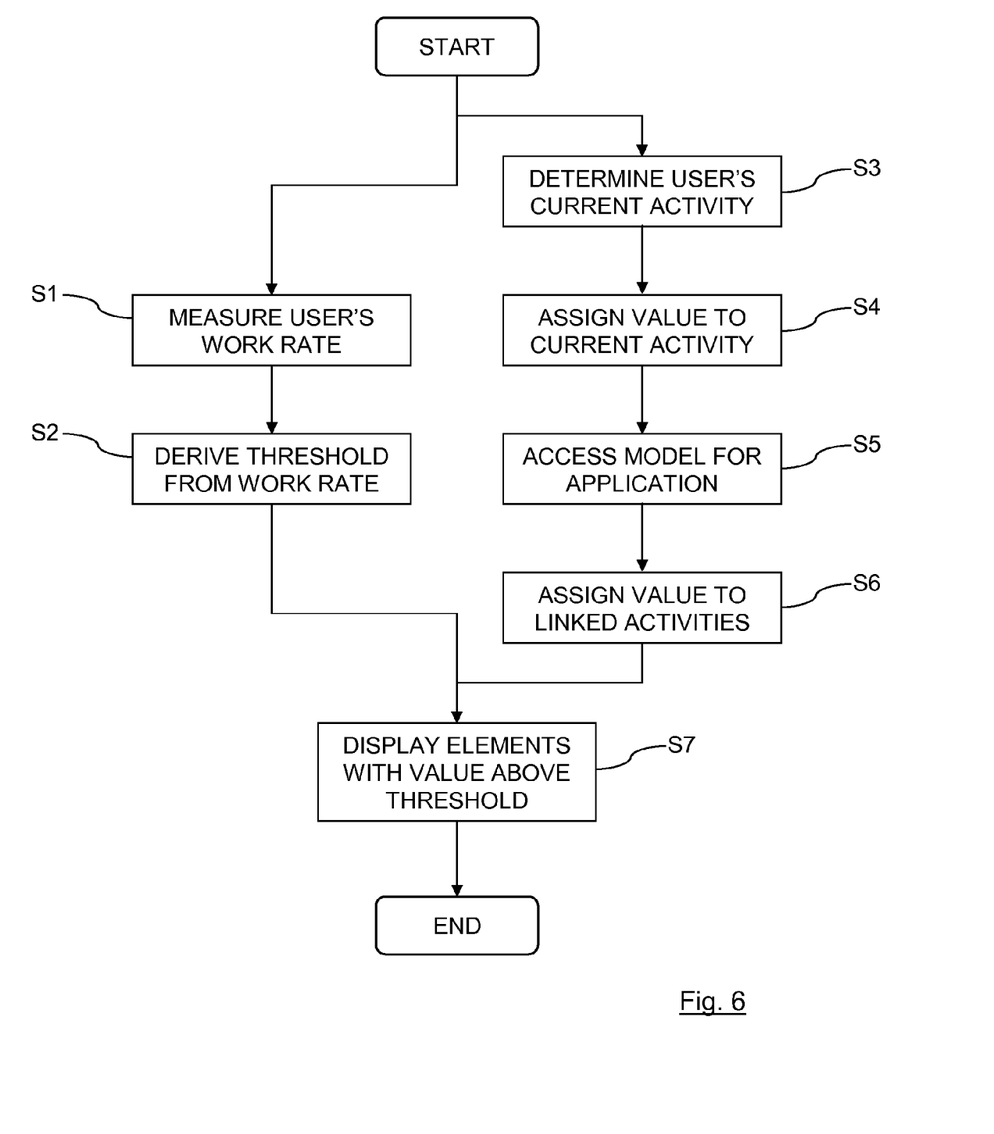
FIG. 6 is a flowchart of a method of constructing a graphical user interface in accordance with an embodiment of the present invention.

Since the user now wants to introduce a picture, they do not continue typing and their activity rate drops further. At this point more loosely related control elements 14 are displayed including the "insert" menu item. This element 14 provides the function the user requires to import their diagram. The action of importing the image has increased the user's activity rate which causes control elements 14 with a low heat and weak relationship to be hidden. Note that due to the recent usage of the diagram importing elements, these will retain heat and therefore their closely related image editing tools will still be displayed. The user is now free to crop and frame their image using the available tools. FIG. 5 shows a graph of the user's work rate translated into a threshold for the above activities.

Although the exemplary embodiments of the present invention have been shown and described, it is to be understood by those skilled in the art that various changes in form and details can be made thereto without departing from the scope and spirit of the present invention as defined in the following claims and equivalents thereof.

We claim:

1. A method comprising:
   measuring a current work rate of a user;
   deriving a threshold from the measured current work rate;
   determining a current activity within an application of the user;
   assigning a value to the determined current activity, wherein the value is dynamically adjusted;
   accessing a model for the application, the model defining links between one or more activities within the application, wherein each of the one or more activities may be associated with one or more control elements, and the control elements may be visibly displayed or hidden;
   assigning values to each of the one or more activities linked within the accessed model to the determined current activity, wherein the values are dynamically adjusted; and
   displaying a control element in a graphical user interface for each activity having a value above the derived threshold, wherein the display of the control element is dynamically adjusted based at least in part on the value assigned to the determined current activity and the value assigned to each of the one or more activities linked within the accessed model to the determined current activity, wherein assigning values to each of the one or more activities linked within the accessed model to the determined current activity includes assigning a value to the linked activities as a function of the value assigned to the determined current activity and wherein a control element for each linked activity is visibly displayed or hidden based on the value assigned to the linked activity as a function of the value assigned to the current activity.

2. The method according to claim 1, wherein at least one link in the model is weighted, and wherein assigning values to each of the one or more activities linked within the accessed model to the determined current activity includes assigning a value to the linked activities as a function of the weighting for the respective link.

3. The method according to claim 2, further including recording the determined current activity within the application and adjusting the weighting of the at least one link in the model according to the recorded current activity.

4. The method according to claim 1, wherein the step of displaying a control element in a graphical user interface for each activity with a value above the derived threshold includes displaying each respective control element at a prominence according to the size of its current value.

5. The method according to claim 1, further including periodically decrementing the current values of activities.

6. The method according to claim 1, further including raising the current value of an activity that is linked to an activity with a current value above zero according to a predefined algorithm.

7. A system comprising:
a display device; and
a processing device configured to,
measure a current work rate of a user;
derive a threshold from the measured current work rate;
determine a current activity within an application of the user;
assign a value to the determined current activity, wherein the value is dynamically adjusted;
access a model for the application, the model defining links between one or more activities within the application, wherein each of the one or more activities may be associated with one or more control elements, and the control elements may be visibly displayed or hidden;
assign values to each of the one or more activities linked within the accessed model to the determined current activity, wherein the values are dynamically adjusted; and
display a control element in a graphical user interface for each activity having a value above the derived threshold, wherein the display of the control element is dynamically adjusted based at least in part on the value assigned to the determined current activity and the value assigned to each of the one or more activities linked within the accessed model to the determined current activity, wherein the processing device assigning values to each of the one or more activities linked within the accessed model to the determined current activity includes assigning a value to the linked activities as a function of the value assigned to the determined current activity and wherein a control element for each linked activity is visibly displayed or hidden by the processing device based on the value assigned to the linked activity as a function of the value assigned to the current activity.

8. The system according to claim 7, wherein at least one link in the model is weighted, and wherein assigning values to each of the one or more activities linked within the accessed model to the determined current activity includes assigning a value to the linked activities as a function of the weighting for the respective link.

9. The system according to claim 8, wherein the processing device is further configured to record the determined current activity within the application and adjusting the weighting of the at least one link in the model according to the recorded current activity.

10. The system according to claim 7, wherein the processing device displaying a control element in a graphical user interface for each activity with a value above the derived threshold includes displaying each respective control element at a prominence according to the size of its current value.

11. The system according claim 7, wherein the processing device is further configured to periodically decrement the current values of activities.

12. The system according to claim 7, wherein the processing device is further configured to raise the current value of an activity that is linked to an activity with a current value above zero according to a predefined algorithm.

13. A non-transitory computer readable storage medium comprising a set of instructions, which, if executed by a processor, cause a computer to:
measure a current work rate of a user;
derive a threshold from the measured current work rate;
determine a current activity within an application of the user;
assign a value to the determined current activity, wherein the value is dynamically adjusted;
access a model for the application, the model defining links between one or more activities within the application, wherein each of the one or more activities may be associated with one or more control elements, and the control elements may be visibly displayed or hidden,
assign values to each of the one or more activities linked within the accessed model to the determined current activity, wherein the values are dynamically adjusted; and
display a control element in a graphical user interface for each activity having a value above the derived threshold, wherein the display of the control element is dynamically adjusted based at least in part on the value assigned to the determined current activity and the value assigned to each of the one or more activities linked within the accessed model to the determined current activity, wherein the set of instructions assigning values to each of the one or more activities linked within the accessed model to the determined current activity includes assigning a value to the linked activities as a function of the value assigned to the determined current activity and wherein a control element for each linked activity is visibly displayed or hidden by the set of instructions based on the value assigned to the linked activity as a function of the value assigned to the current activity.

14. The medium according to claim 13, wherein at least one link in the model is weighted, and wherein assigning values to each of the one or more activities linked within the accessed model to the determined current activity includes assigning a value to the linked activities as a function of the weighting for the respective link.

15. The medium according to claim 13, wherein the set of instructions displaying a control element in a graphical user interface for each activity with a value above the derived threshold includes displaying each respective control element at a prominence according to the size of its current value.

16. The medium according to claim 13, wherein the set of instructions are further configured to periodically decrement the current values of activities.

17. The medium according to claim 13, wherein the set of instructions are further configured to raise the current value of an activity that is linked to an activity with a current value above zero according to a predefined algorithm.

* * * * *